United States Patent [19]

Olewinski et al.

[11] Patent Number: 5,598,994

[45] Date of Patent: Feb. 4, 1997

[54] STUD ENGAGING DEVICE

[75] Inventors: Stephen Olewinski, Crestwood; James A. Brownlee, Park Forest, both of Ill.

[73] Assignee: Panduit Corp., Tinley Park, Ill.

[21] Appl. No.: 496,777

[22] Filed: Jun. 29, 1995

[51] Int. Cl.$^6$ ................................................. F16L 3/00
[52] U.S. Cl. ..................... 248/73; 248/74.3; 411/431; 411/433; 411/511; 411/918
[58] Field of Search ............................ 248/73, 74.3, 60; 411/433, 437, 525, 526, 527, 918, 511, 431, 521, 520, 522, 523, 524, 519, 427

[56] References Cited

U.S. PATENT DOCUMENTS

| | | | |
|---|---|---|---|
| 762,419 | 6/1904 | Lawson | 411/521 |
| 3,147,523 | 9/1964 | Logan . | |
| 3,461,510 | 8/1969 | Holmes . | |
| 3,471,109 | 10/1969 | Meyer | 248/74.3 |
| 3,568,262 | 3/1971 | Woldman | 248/74.3 |
| 4,518,297 | 5/1985 | Kraus . | |
| 4,541,153 | 9/1985 | Schaty . | |
| 4,570,303 | 2/1986 | Richmond et al. | 411/437 |
| 4,728,064 | 3/1988 | Caveney . | |
| 4,828,444 | 5/1989 | Oshida | 411/437 |
| 4,971,647 | 11/1990 | Leslie | 441/512 |
| 4,995,777 | 2/1991 | Warmington | 411/512 |
| 4,999,019 | 3/1991 | Kraus | 411/437 |
| 5,090,854 | 2/1992 | Hafeli et al. | 411/427 |
| 5,154,376 | 10/1992 | Baum et al. | 248/74.3 |
| 5,302,070 | 4/1994 | Kameyama . | |
| 5,423,647 | 6/1995 | Suzuki | 411/437 |
| 5,451,124 | 9/1995 | Meigs | 411/433 |

Primary Examiner—Ramon O. Ramirez
Assistant Examiner—Michael J. Turgeon
Attorney, Agent, or Firm—Mark D. Hilliard; Robert A. McCann

[57] ABSTRACT

A device for engagement with a threaded post or stud, including a housing having a generally cylindrical axial bore with a top side and a bottom side for engagement with the stud from either the top or bottom sides. The stud engaging member includes a plurality of flexible tangs and can further include an integrally formed cable tie for securing a bundle of wires to the threaded stud.

20 Claims, 3 Drawing Sheets

STUD ENGAGING DEVICE

TECHNICAL FIELD

The present invention relates generally to a two-way reversible stud engaging device, and more particularly to a reversible threaded stud engaging device having a top side and a bottom side whereby the device can be attached to a threaded post or stud from either the top or the bottom side and is integrally connected to a cable tie.

BACKGROUND OF THE INVENTION

Cable ties have been widely accepted for bundling together electric wires and cables. A wide variety of specialty cable ties are known for accomplishing a variety of more specific wire bundling tasks. An example of a specialty tie is the stud mounted ties which are devices used to fasten a bundle of wires to a mounting surface having a threaded bolt or stud. Stud mounted ties include a mounting element integrally formed with a cable tie including a strap and locking head. The threaded post such as a welded stud projects from the mounting surface and the mounting device is secured thereto, while the cable tie secures a bundle of wires.

One problem which arises during application of prior stud mount cable ties is that the locking mechanism of the mounting device is some form of angled projections that are limited in their flexibility. This results in the stud mounting member portion being restricted to application on the stud in only one direction. Therefore, stud mount ties are often difficult or impossible to apply due to space restrictions. Thus, there is the need for improvement in the art.

SUMMARY OF THE INVENTION

It is an object of the present invention to provide an improved threaded stud mounting device.

It is another object of the invention to provide a two-way threaded stud mounting device which can be applied onto the threaded stud from either the top or the bottom of the mounting device.

It is still further an object of the present invention to provide an improved stud mount cable tie.

In general a stud mounting device includes a housing forming a chamber including an axial bore having a top side and a bottom side, and a plurality of fingers flexibly connected to an interior wall of the chamber, wherein each finger includes a pair of oppositely extending thread engaging tangs oriented towards the top and bottom sides respectively.

A stud mounting device can also include a housing having a top and a bottom and including a cylindrical bore forming a chamber of sufficient diameter to allow the housing to be placed over a threaded post and flexible securement means positioned inside the cylindrical bore and dimensioned for securing the housing to the threaded post such that the housing can be mounted on the threaded post with either the top or bottom of the housing facing down.

DESCRIPTION OF THE PREFERRED EMBODIMENT

Figure 1:
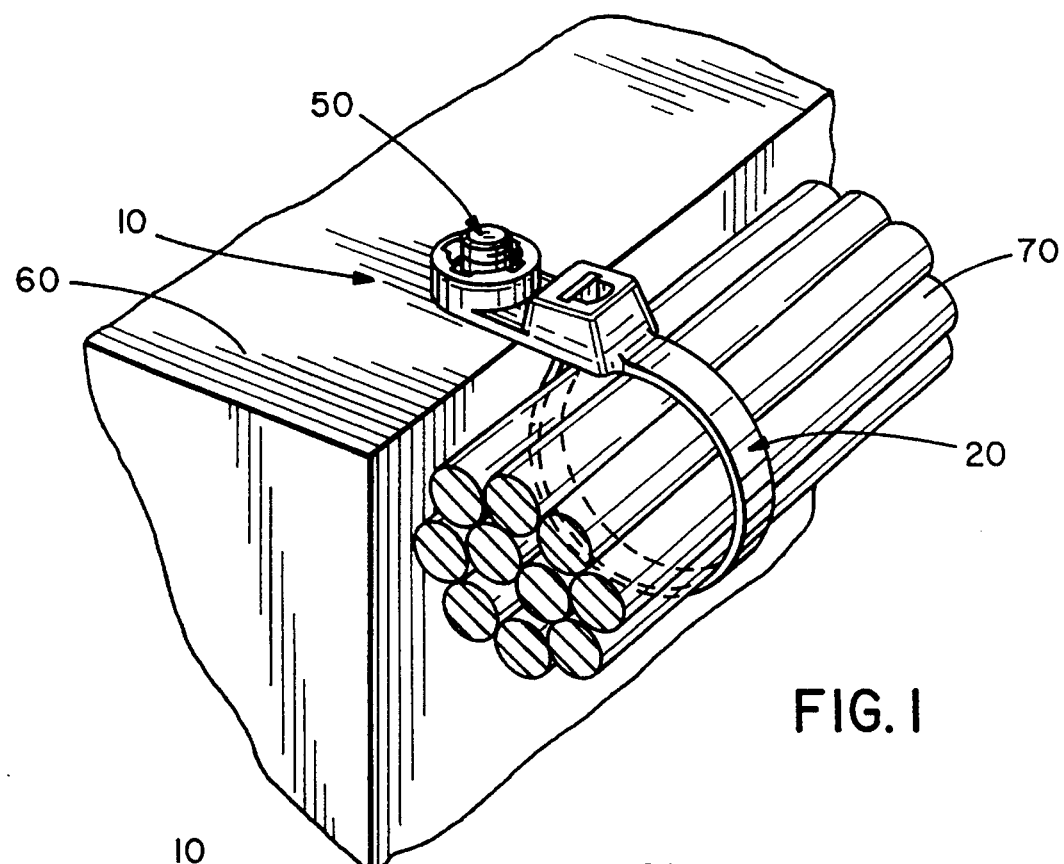
FIG. 1 is an isometric view of a stud mount cable tie applied to a bundle of wires and fixed to a threaded stud in accordance with an embodiment of the present invention.
Figure 2:
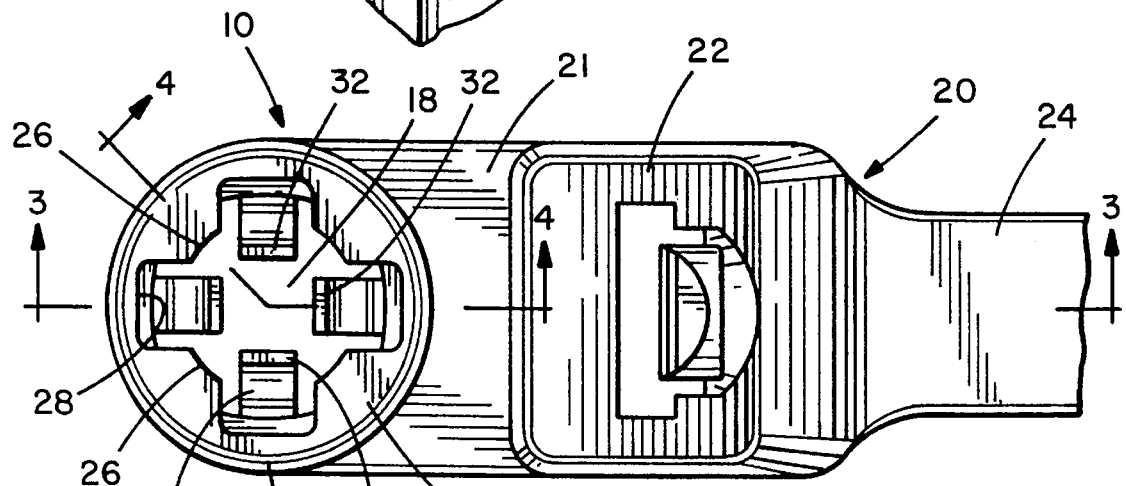
FIG. 2 is a partial plan view of the mounting device and cable tie head of the embodiment of FIG. 1.
Figure 3:
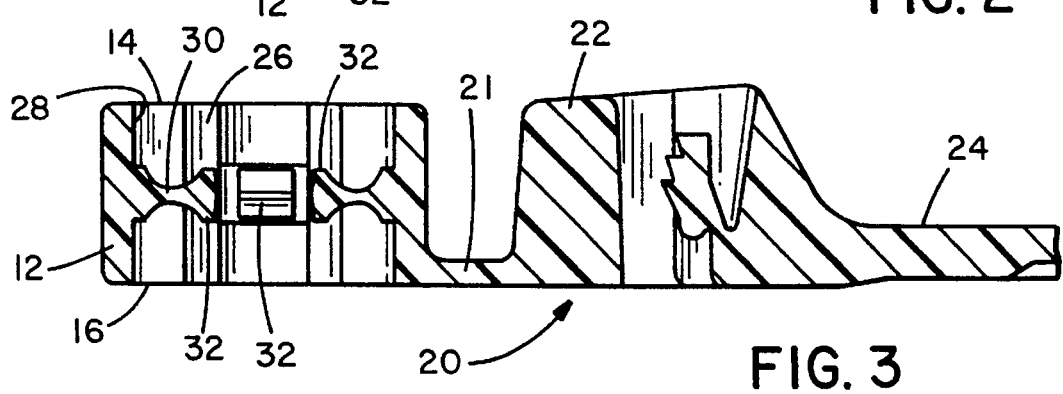
FIG. 3 is a sectional side view of the mounting device and cable tie head taken along lines 3—3 of FIG. 2.

A stud engaging device embodying the concept of the present invention is designated generally by the reference numeral 10 in the accompanying drawings. Stud engaging device 10 is shown in FIG. 1 mounted on a threaded stud 50 of mounting surface 60 and is attached by a flexible member 21 to a cable tie 20 that is secured around a bundle of wires 70. As shown, the cable tie 20 is a standard cable tie having a strap 24 a locking head 22. Stud engaging device 10 as seen in FIGS. 2 and 3 includes a housing 12 having a top 14 and a bottom 16 with a cylindrical bore 18 therethrough. An interior wall 28 of housing 12 includes four locking fingers 30 flexibly attached and projecting from the interior wall 28 at right angles thereto and at a midpoint between the top 14 and bottom sides 16 of the interior wall 28 of housing 12. Additionally, the locking fingers 30 are formed at 90° intervals around the circumference of the interior wall 28. Locking fingers 30 are further provided at their distal ends with top and bottom oriented tangs 32 which are dimensioned so as to fit within the pitch of threaded stud 50 and be engageable with the thread groove 34 of stud 50.

Figure 4:
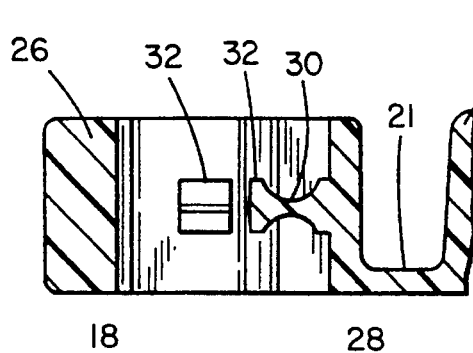
FIG. 4 is a sectional side view of the mounting device taken along lines 4—4 of FIG. 2.
Figure 5:
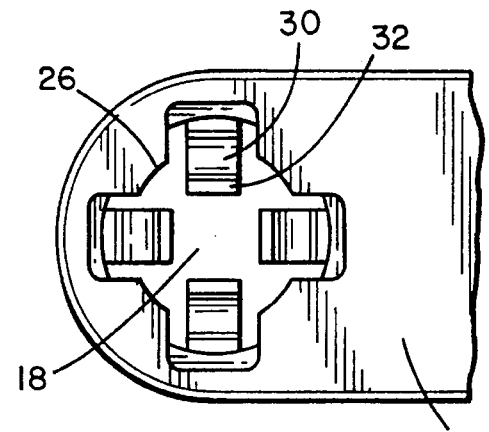
FIG. 5 is a bottom view of the mounting device of the cable tie of FIG. 1.

As best seen in FIGS. 4 and 5, the inside of the housing 12 also includes a plurality of pilot sections 26 which are situated in between locking fingers 30 and shaped so as to provide an inner housing diameter that more closely approximates but is larger than that of the threaded stud 50. The shaped pilot sections 26 help to prevent undue rocking of the stud engaging device 10 on the stud 50. Locking fingers 30 extend beyond pilot sections 26. Therefore, as the stud engaging device 10 is mounted on stud 50, the tangs 32 on the ends of locking fingers 30 which are on the top or bottom side being placed on stud 50 will interfere with the crests of the threads of stud 50 and flex upwards and into the recesses formed between pilots 26. Fingers 30 being flexibly connected by a hinge portion of sufficient length and flexibility such that tangs 32 flex upwards past an outer thread diameter of stud 50. After stud engaging device 10 has been fully pressed onto stud 50, the tangs 32 of the plurality of locking fingers 30 will be engaged with thread grooves 34, thus preventing removal of the housing 12 from stud 50.

Figure 6:
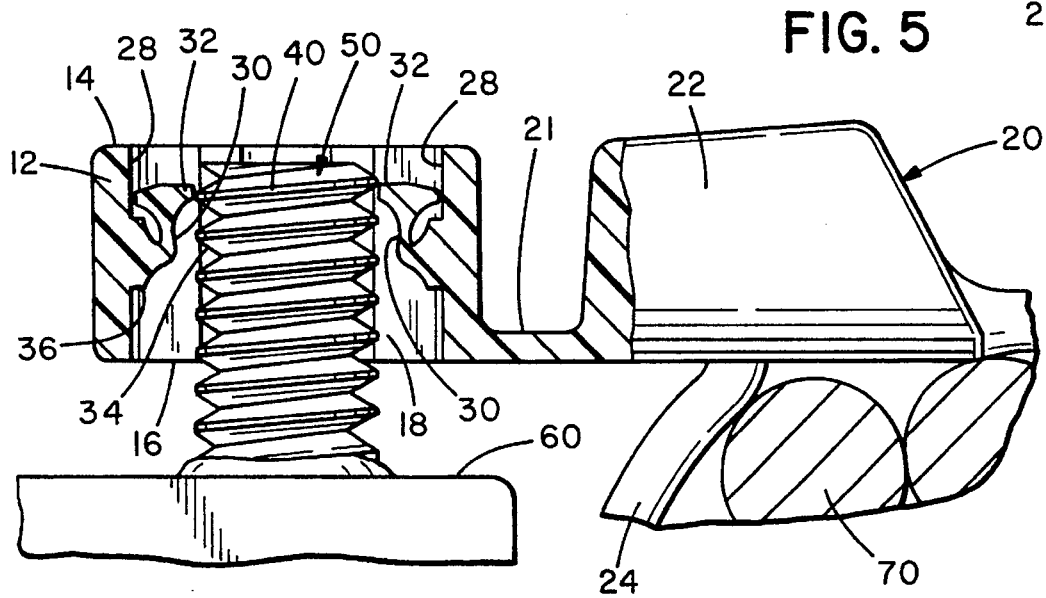
FIG. 6 is a sectional side view of the mounting device of the cable tie of FIG. 1 being applied bottom side down to a threaded stud.
Figure 7:
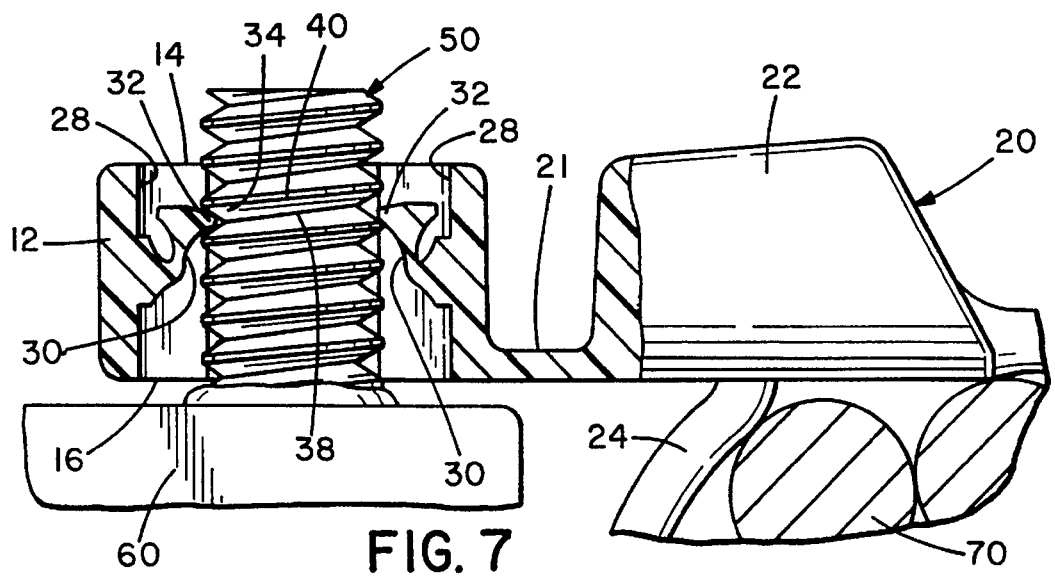
FIG. 7 is a sectional side view of the mounting device of the cable tie of FIG. 1 fully secured bottom side down to a threaded stud.

As can be seen in FIGS. 6–9, stud engaging device 10 can be mounted to a threaded bolt 50 from either the top 14 or bottom side 16 of housing 12. FIG. 6 shows the stud engaging device 10 being applied bottom first to stud 50. As housing 12 is placed on stud 50, locking fingers 30 flex upward into the recesses formed above the fingers 30 and between pilot sections 26. This allows for the tangs 32 oriented towards the bottom 16 of housing 12 to pass the outer thread diameter 40 of the stud 50 as stud engaging device 10 is pushed fully onto stud 50. As can be seen in FIG. 7, when the stud engaging device 10 has been fully mounted onto the stud 50 at least one tang 32 of one locking finger 30 is fully situated in the thread groove 34 so as to prevent withdrawal from the stud 50.

Figure 8:
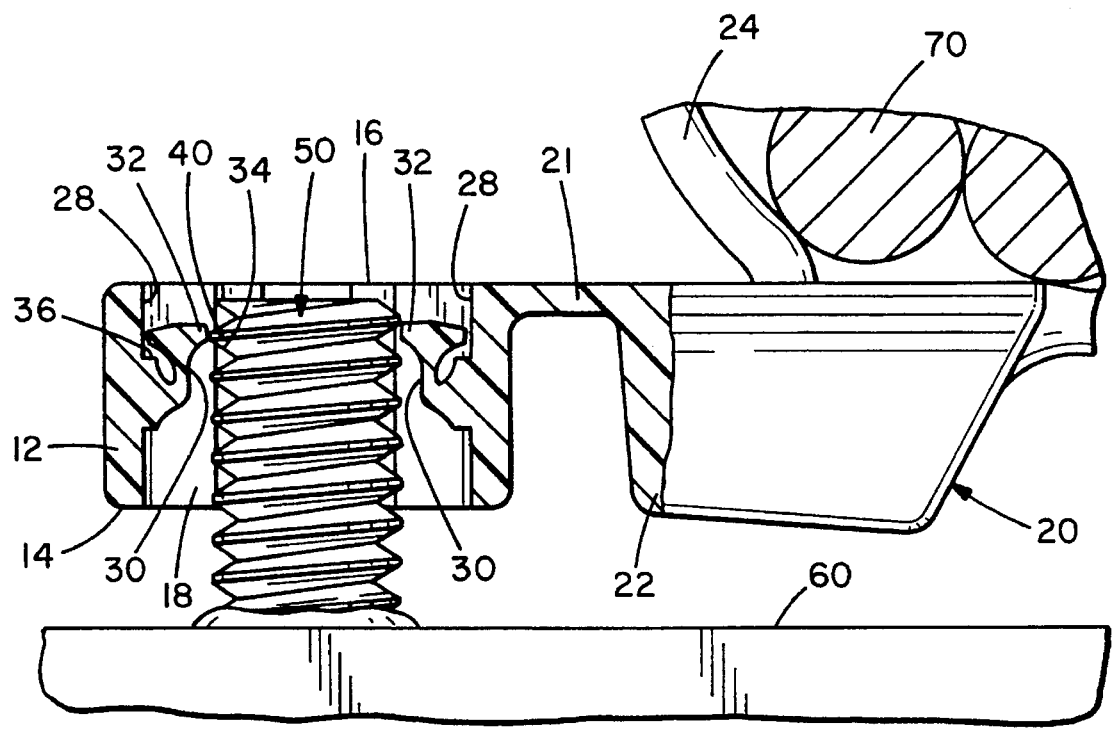
FIG. 8 is a sectional side view of the mounting device of the cable tie of FIG. 1 being applied top side down to a threaded stud.
Figure 9:
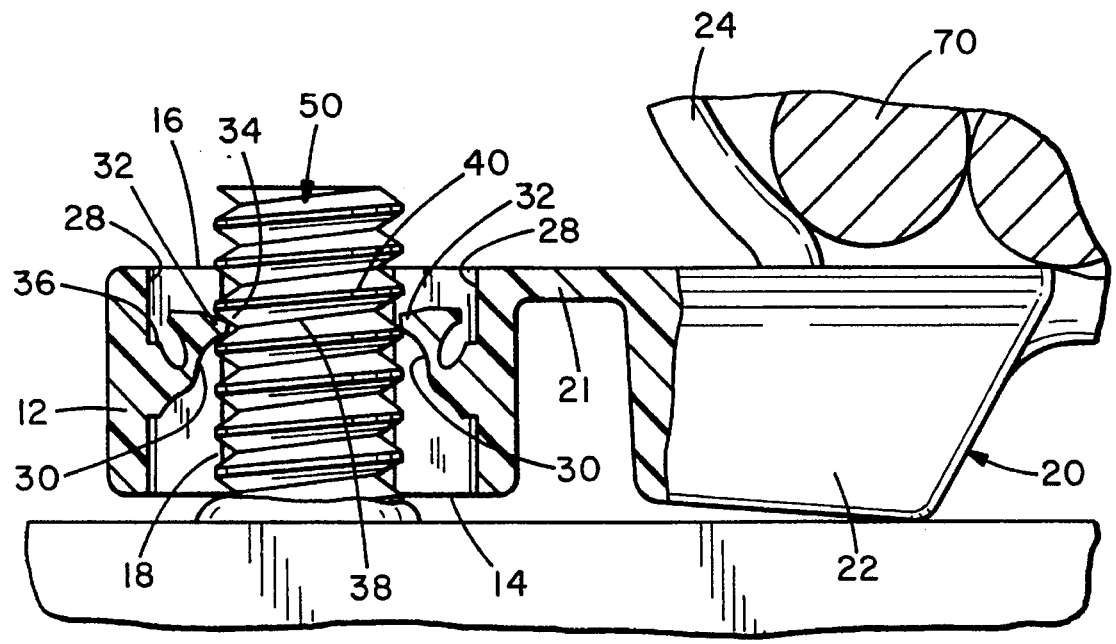
FIG. 9 is a sectional side view of the mounting device of the cable tie of FIG. 1 fully secured top side down to a threaded stud.

FIGS. 8 and 9 show the same sequence but with the stud engaging device 10 mounted with the top side 14 first. In this case the tang 32 oriented towards the top 14 of housing 12 will engage with thread groove 34 to secure stud engaging device 10 to stud 50.

As can be seen in FIGS. 6–9, the base portion of locking fingers 30, where locking fingers 30 project from interior wall 28, is formed as a shoulder portion 36 which strengthens fingers 30 and provides an additional stop for preventing withdrawal of stud engaging device 10.

It is to be noted that while the application herein described and shown in the accompanying drawings is for a stud mount type cable tie, that the two-way mounting member can be used in a variety of other applications including by itself as a nut. Additionally, while it has been shown used on a welded stud, it is also applicable to other types of threaded posts such as screws or bolts.

While the particular embodiment of the present invention has been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A stud engaging device for engaging a threaded post comprising:
   a housing forming a chamber including an axial bore having a top side and a bottom side; a plurality of fingers flexibly connected to an interior wall of the chamber, wherein at least one finger includes a pair of oppositely extending thread engaging tangs both dimensioned so as to substantially fit within and be engageable with a thread groove of the threaded post with either the top side or bottom side facing down and oriented towards the top and bottom sides respectively.

2. A stud engaging device according to claim 1, wherein the fingers extend substantially perpendicular to the interior wall.

3. A stud engaging device according to claim 1, wherein the interior wall of the chamber includes a plurality of pilot sections formed adjacent the fingers.

4. A stud engaging device according to claim 3, wherein the plurality of pilot sections are shaped so as to form an inner diameter that is slightly larger than an outer thread diameter of the stud.

5. A stud engaging device according to claim 1, wherein the fingers include a shoulder portion formed at a base where the fingers project from the interior wall.

6. A stud engaging device according to claim 1, wherein there are an even number of locking fingers.

7. A stud engaging device according to claim 1, wherein the fingers are flexibly connected by a hinge portion of sufficient length and flexibility such that the tangs flex upwards past an outer thread diameter during mounting.

8. A stud engaging device according to claim 1, wherein the fingers extend from a midpoint between the top and bottom sides of the interior wall of the housing.

9. A stud engaging device according to claim 1, wherein the thread engaging tangs are formed at a distal end of the fingers.

10. A stud engaging device according to claim 1, wherein the housing is integrally connected to a cable tie.

11. A stud engaging device for engaging a threaded post, comprising:
    a housing having a top and a bottom and including a cylindrical bore forming a chamber of sufficient diameter to allow the housing to be placed over a threaded post;
    flexible securement means positioned inside the cylindrical bore and dimensioned for securing the housing to the threaded post such that the housing can be mounted on the threaded post with either the top or bottom of the housing facing down, wherein the securement means comprises a plurality of locking fingers flexibly connected to an interior wall of the housing and including at least one locking finger having a pair of thread engaging tangs formed at a distal end and oriented toward the top and bottom of the housing respectively, both dimensioned so as to fit within and be engageable with a thread groove of the threaded post.

12. A stud engaging device according to claim 11, wherein the locking fingers project at a right angle from the interior wall.

13. A stud engaging device according to claim 11, in which there are four locking fingers.

14. A stud engaging device according to claim 11, in which there are two locking fingers.

15. A stud engaging device according to claim 11, wherein the securement means further includes pilot sections extending into the chamber and formed adjacent the locking fingers.

16. A stud engaging device according to claim 15, wherein the pilot sections are shaped so as to form an inner diameter that is slightly larger than an outer diameter of the threaded post.

17. A stud engaging device according to claim 11, wherein the housing is integrally connected to a cable tie.

18. A stud engaging device according to claim 17, wherein the housing is integrally connected to a head of the cable tie.

19. A stud engaging device according to claim 17, wherein the housing is integrally connected to a strap of the cable tie.

20. A stud engaging device according to claim 11, wherein the locking fingers include a shoulder portion at the interior housing wall.

\* \* \* \* \*